United States Patent
Saida

(10) Patent No.: US 9,064,206 B2
(45) Date of Patent: Jun. 23, 2015

(54) IMAGE FORMING APPARATUS THAT PRINTS IMAGE DATA INCLUDING COLOR CODE SYMBOL

(71) Applicant: CANON KABUSHIKI KAISHA, Tokyo (JP)

(72) Inventor: Tadaaki Saida, Kashiwa (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 13/945,650

(22) Filed: Jul. 18, 2013

(65) Prior Publication Data

US 2014/0029026 A1  Jan. 30, 2014

(30) Foreign Application Priority Data

Jul. 24, 2012  (JP) .................................. 2012-163595

(51) Int. Cl.
*G06F 15/00* (2006.01)
*G06K 15/00* (2006.01)
*H04N 1/00* (2006.01)
*H04N 1/32* (2006.01)

(52) U.S. Cl.
CPC ........ *G06K 15/40* (2013.01); *H04N 2201/3256* (2013.01); *H04N 2201/3242* (2013.01); *H04N 2201/3243* (2013.01); *H04N 1/00363* (2013.01); *H04N 1/00968* (2013.01); *H04N 1/32325* (2013.01); *H04N 2201/3269* (2013.01); *H04N 2201/3271* (2013.01)

(58) Field of Classification Search
None
See application file for complete search history.

(56) References Cited

U.S. PATENT DOCUMENTS

2005/0179961 A1*  8/2005  Czyszczewski et al. ...... 358/468
2013/0233927 A1*  9/2013  Suzuki ..................... 235/462.04

FOREIGN PATENT DOCUMENTS

JP           10-055420 A     2/1998

\* cited by examiner

*Primary Examiner* — Paul F Payer
(74) *Attorney, Agent, or Firm* — Rossi, Kimms & McDowell LLP

(57) ABSTRACT

An image forming apparatus capable of printing image data including a color code symbol without damaging information held in the code symbol even in an environment where only monochrome printing is possible due to print settings or the capability of an apparatus. A code symbol is extracted from input image data, and code symbol information is acquired from the extracted code symbol. It is determined whether or not an image to be output by performing image processing on the input image data is a monochrome image. When it is determined that the image to be output is a monochrome image, a monochrome code symbol is generated based on the acquired code symbol information. The generated monochrome code symbol and the image to be output are synthesized, and the synthesized image is output.

9 Claims, 5 Drawing Sheets

IMAGE FORMING APPARATUS THAT PRINTS IMAGE DATA INCLUDING COLOR CODE SYMBOL

BACKGROUND OF THE INVENTION

1. Field of the Invention

The present invention relates to an image forming apparatus that prints image data including a color code symbol, and more particularly to a technique for printing a code symbol.

2. Description of the Related Art

There has been proposed a technique of printing a geometric figure corresponding to coded information in addition to characters and images on a recording medium to thereby embed the coded information in a printout. Well-know examples of the geometric figure corresponding to coded information include a bar code and a QR code (registered trademark).

Further, the recording medium is not limited to a physical medium, such as paper, but by embedding a code symbol in electronic image data, it is also possible to perform embedding of information.

Further, a bar code in colors or in the form of a two-dimensional code makes it possible to encode an increased amount of information. As a consequence, by encoding an image or audio data, or by encoding data of an original image, it is possible to copy an image without deteriorating the image, and further, by encoding security information, it is also possible to inhibit copying of documents (see e.g. Japanese Patent Laid-Open Publication No. H10-055420).

When an image is printed by reading from an original, there are cases where it is required to print a code symbol in single black color depending on user setting or the type of an apparatus used for printing. More specifically, there are, for example, a case where a user has selected printing in a monochrome mode even though a printer capable of performing color printing is used, and a case where the printer is a monochrome printer incapable of performing color printing. In such cases, an image of a color code symbol (color code) is printed as a halftone image in single black color, but it is technically difficult to reproduce the code symbol in single black color without losing information held in the color code at the time of printing.

As described above, if a color code is copied in monochrome, information held in the color code is lost. This brings about a problem that information cannot be acquired from the code symbol copied on the sheet, and a problem that a function using the information held in the color code (e.g. a function of inhibiting copying for security purposes) becomes unavailable.

Further, there has been proposed a method in which when storing image data read from a color original in a hard disk, the data is stored as monochrome image data so as to reduce the amount of data to be stored. In such a case as well, similarly to the above, a color code is changed into monochrome image data, and hence information held on the original in the color code is sometimes lost.

SUMMARY OF THE INVENTION

The present invention provides an image forming apparatus capable of printing image data including a color code symbol without damaging information held in the code symbol even in an environment where only monochrome printing is possible due to print settings or the capability of an apparatus.

In a first aspect of the present invention, there is provided an image forming apparatus comprising an information acquisition unit configured to extract a code symbol from input image data, and acquire code symbol information from the extracted code symbol, a determination unit configured to determine whether or not an image to be output after performing image processing on the input image data is a single-color image, a code symbol generation unit configured to, when it is determined by the determination unit that the image to be output is a single-color image, generate a single-color code symbol based on the acquired code symbol information, and an image synthesis unit configured to synthesize the generated single-color code symbol with the image to be output, and output the synthesized image.

According to the present invention, it is possible to print image data including a color code symbol without damaging information held in the code symbol even in an environment where only monochrome printing is possible due to print settings or the capability of an apparatus.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
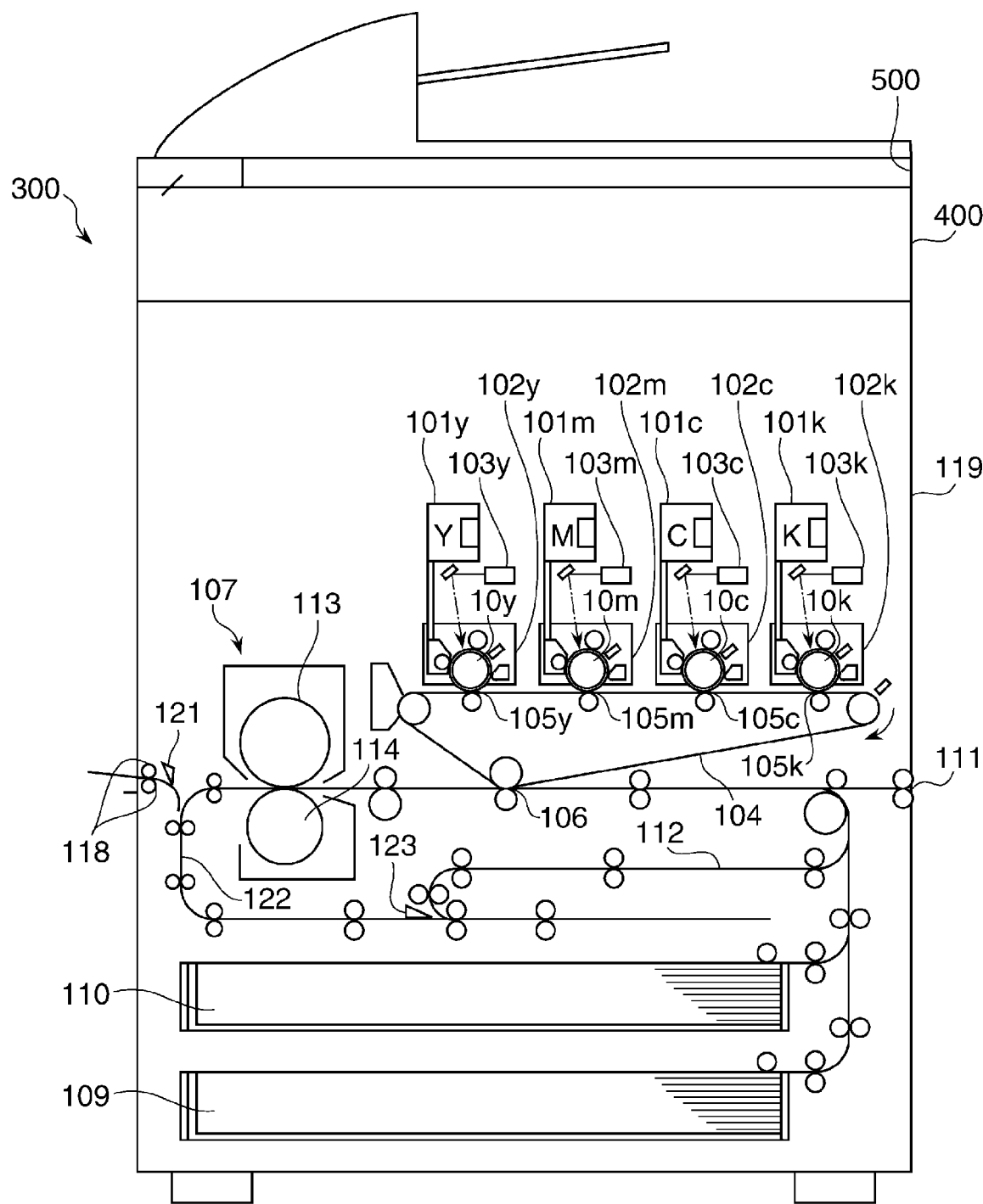
FIG. 1 is a schematic diagram of an image forming apparatus according to a first embodiment of the present invention.

FIG. 1 is a schematic diagram of an image forming apparatus according to a first embodiment of the present invention.

The image forming apparatus, denoted by reference numeral 300, is implemented e.g. by a digital copier, and includes a document feeder 500, an image reading unit 400, and an image output unit 119.

Although not shown, the document feeder 500 sequentially conveys set documents, one by one, starting with the first document, on a platen glass (document platen glass) from left to right via a curved path, and then discharges each document onto a discharge tray.

A scanner unit, not shown, included in the image reading unit 400 is in a state held at a predetermined location, and when a document passes from left to right before the scanner unit, the document is read. When a document passes the scanner unit, light from a lamp, not shown, of the scanner unit is irradiated onto the document, and light reflected from the document is guided to an image sensor (not shown) via mirrors (not shown). Note that a document can also be read by conveying a document onto the platen glass by the document feeder 500, then stopping the same thereat, and moving the scanner unit from left to right.

An image of the document read by the image sensor is subjected to image processing, and is delivered to exposure controllers 103*y*, 103*m*, 103*c*, and 103*k* of the image output unit 119. Toner replenishing sections 101*y*, 101*m*, 101*c*, and 101*k* replenish developing sections 102*y*, 102*m*, 102*c*, and 102*k* with toner.

Laser beams output from the exposure controllers 103*y*, 103*m*, 103*c*, and 103*k* are irradiated onto photosensitive drums 10*y*, 10*m*, 10*c*, and 10*k*, respectively. As a result, electrostatic latent images are formed on the photosensitive drums 10*y*, 10*m*, 10*c*, and 10*k*, respectively.

The electrostatic latent images formed on the photosensitive drums 10*y*, 10*m*, 10*c*, and 10*k* are developed by the developing sections 102*y*, 102*m*, 102*c*, and 102*k*, respectively, and are transferred onto an intermediate transfer belt 104 in a superimposed fashion by primary transfer sections 105*y*, 105*m*, 105*c*, and 105*k*. Then, a toner image thus transferred onto the intermediate transfer belt 104 is transferred by a second transfer section 106 onto a sheet fed from one of cassettes 109 and 110, a manual sheet feeder 111, and a double-sided printing conveying path 112. The sheet on which the toner image has been transferred is subjected to processing for fixing the toner image by fixing rollers 113 and 114 at a fixing section 107.

The sheet having passed the fixing section 107 is once guided into a path 122 by a flapper 121, and after a trailing edge of the sheet has passed the flapper 121, the sheet is caused to switch back, and is guided to a discharge roller pair 118 by the flapper 121. As a result, the sheet is discharged from the image forming apparatus 300 by the discharge roller pair 118 in a state in which a side of the sheet on which the toner image has been transferred faces downward (face-down).

When double-side printing is performed, the sheet having passed the fixing section 107 is once guided to the path 122 by the flapper 121, and after the trailing edge of the sheet has passed a flapper 123, the sheet is caused to switch back to be guided into the double-sided printing conveying path 112 by the flapper 123.

Figure 2:
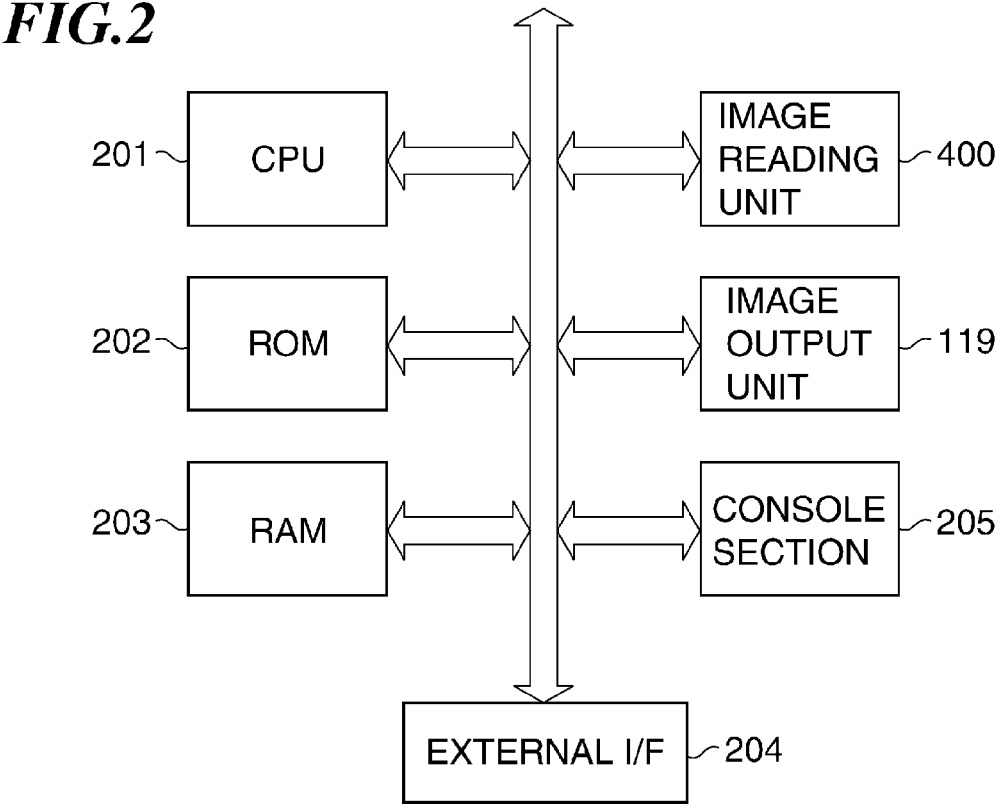
FIG. 2 is a schematic block diagram of the functional configuration of the image forming apparatus shown in FIG. 1.

FIG. 2 is a schematic block diagram of the functional configuration of the image forming apparatus 300 shown in FIG. 1.

A CPU 201 controls the overall operation of the image forming apparatus 300. A ROM 202 is a memory storing a control program executed by the CPU 201. A RAM 203 is a memory used as a work area necessary for the CPU 201 to control the sections of the image forming apparatus 300. The RAM 203 is used not only as the work area of the CPU 201, but also as a storage area which can store digital images obtained by reading documents by the image reading unit 400, digital images transmitted from outside the image forming apparatus 300 via an external interface 204, and so forth. Further, the RAM 203 is also used as a work area for performing image processing on digital images obtained by the image reading unit 400 and obtained via the external interface 204.

A console section 205 functions as an operation section for setting e.g. a copy job which a user desires to cause the image forming apparatus 300 to execute, and as a display section for displaying e.g. the setting status and the operating state of the image forming apparatus 300. Note that not only a print job input from the console section 205 but also a print job input and instructed from outside the image forming apparatus 300 via the external interface 204 can be executed.

The CPU 201 reads and digitalizes an image of a document which is set on the document feeder 500 or on the document platen glass according to a setting operation performed by a user on the console section 205, and stores the digital image in the RAM 203. Further, the CPU 201 performs necessary image processing on the digital image according to copy job settings made by the user on the console section 205, such as the setting of single-sided printing or double-sided printing, and the contents of the image read by the image reading unit 400, and stores the processed image in the RAM 203.

The external interface 204 is connected to a network using e.g. TCP/IP, and is capable of receiving an instruction for executing e.g. a print job from a computer connected to the network, and notifying the computer, via the network, of information which is held in the image forming apparatus.

Figure 3:
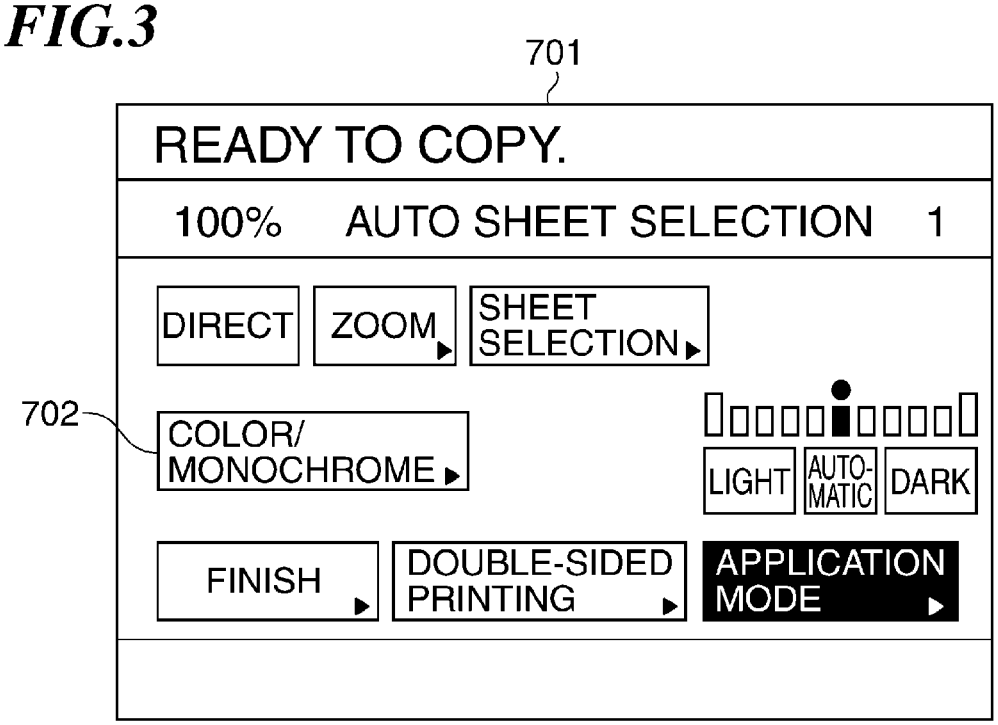
FIG. 3 is a diagram of an example of the appearance of a console section of the image forming apparatus.

FIG. 3 is a diagram of an example of the appearance of the console section 205 appearing in FIG. 2.

The console section 205 includes a touch panel 701, on which software keys are arranged as shown in FIG. 3. It is possible to configure the setting of a sheet, the setting of single-sided printing/double-sided printing, the color mode setting for setting a color mode/monochrome mode, and so forth, using these software keys. The user can set one of the color mode and the monochrome mode (single-color mode) using a color mode setting key 702.

Figure 4:
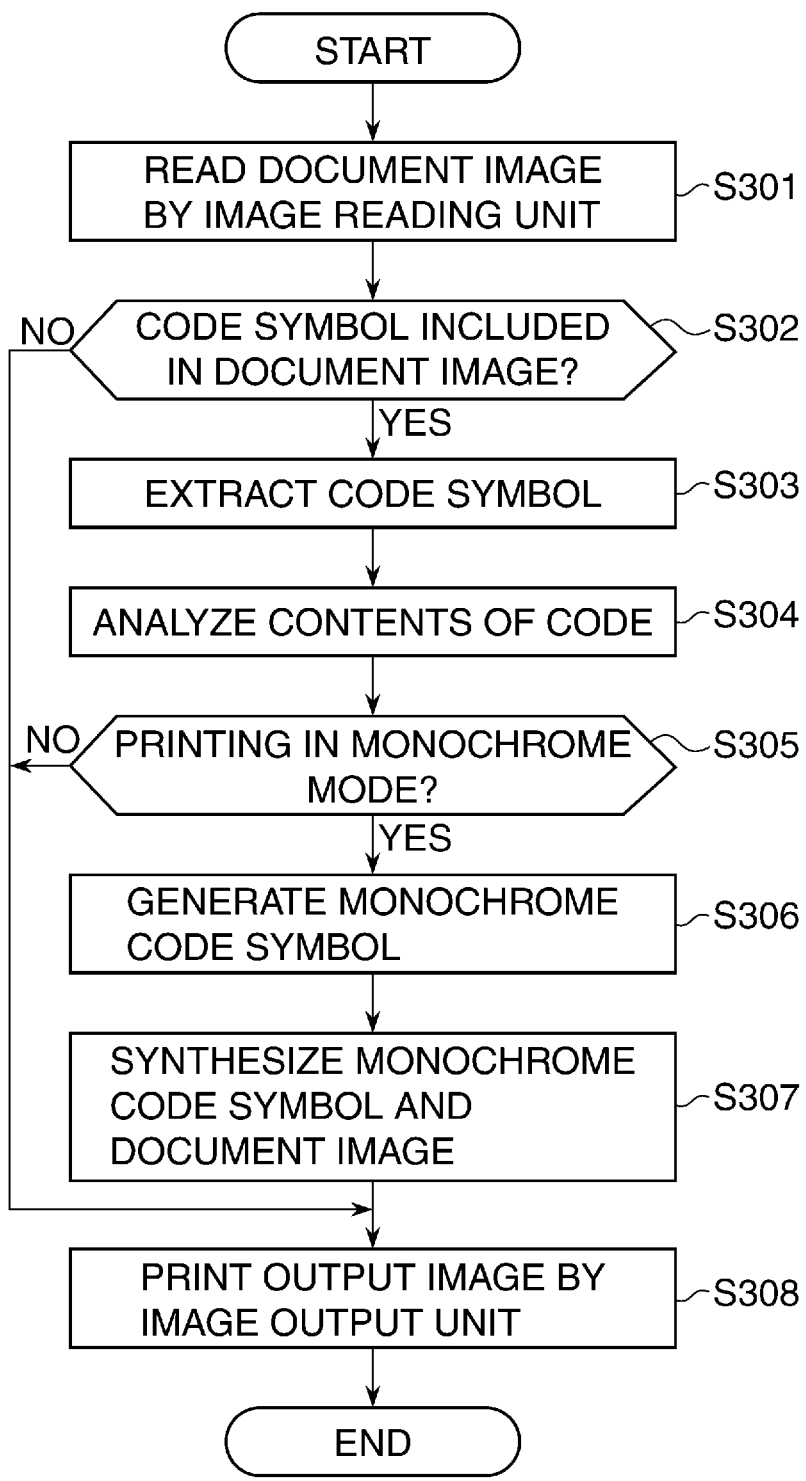
FIG. 4 is a flowchart of a code symbol conversion process executed by the image forming apparatus according to the first embodiment.

FIG. 4 is a flowchart of a code symbol conversion process executed when reading a document by the image forming apparatus according to the first embodiment. The process described hereafter is realized by the CPU 201.

First, the CPU 201 instructs the image reading unit 400 to read an image of a document, and stores the obtained image data in the RAM 203 (step S301).

Next, the CPU 201 determines whether or not a code symbol is included in the image data stored in the RAM 203 (step S302). If it is determined that a code symbol is included, the CPU 201 proceeds to a step S303. On the other hand, if it is determined that a code symbol is not included (NO to the step S302), the CPU 201 proceeds to a step S308 without executing code symbol conversion to be executed in the step S303 to a step S307. In the step S308, the CPU 201 instructs the image output unit 119 to execute processing for printing the image data stored in the RAM 203.

In the step S303, the CPU 201 identifies part of the image data stored in the RAM 203, where the code symbol is included, and extracts the code symbol. Next, the CPU 201 analyzes the read code symbol image to acquire information (code symbol information) from the code symbol (step S304). The steps S303 and S304 correspond to an example of the operation of an information acquisition unit.

Next, the CPU 201 checks the color mode setting for printing made by the user on the console section 205 to determine whether or not printing (recording) in the monochrome mode is set (step S305). Although in the present embodiment, whether or not printing in the monochrome mode is set is determined according to the color mode setting for printing made by the user, this is not limiting. For example, the determination may be made based on the remaining amounts of color toner, and if printing is possible only by monochrome toner (black toner) because of shortage of color toner, the step S306 et seq. may be executed.

If it is determined according to the color mode setting in the step S305 that printing in the full color mode is set (NO to the step S305), the CPU 201 proceeds to the step S308 without executing code symbol conversion. On the other hand, if it is determined according to the color mode setting that printing in the monochrome mode is set, the CPU 201 proceeds to the step S306.

In the step S306, the CPU 201 generates a monochrome two-dimensional code symbol using the RAM 203 based on the code symbol information acquired from the code symbol in the step S304. The step S306 corresponds to an example of the operation of a code symbol generation unit.

Next, the CPU 201 synthesizes the code symbol image generated using the RAM 203 and the document image data stored in the RAM 203 (step S307). At this time, the code symbol image and the document image data are synthesized such that the color code symbol arranged on the original document image is converted to a monochrome code symbol. The step S307 corresponds to an example of the operation of an image synthesis unit. Then, the CPU 201 instructs the image output unit 119 to execute processing for printing the synthesized image data in the RAM 203 (step S308).

Although in the above-described process, the determination of whether or not a code symbol is included and the extraction of the code symbol are performed with respect to the image data (electronic data) of the document, it is to be understood that the determination and the extraction may be performed with respect to a document image loaded into the RAM 203.

Figure 5:
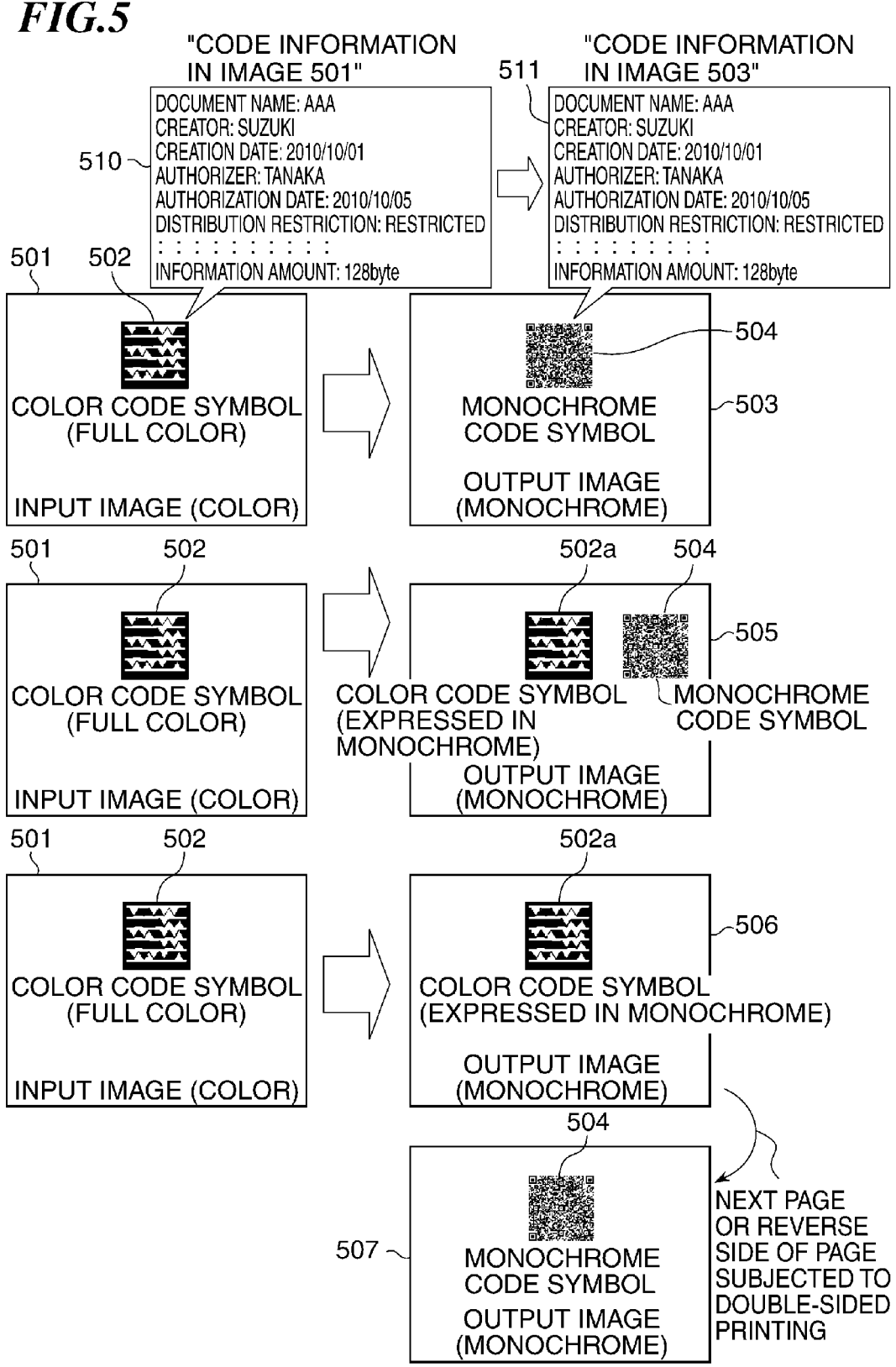
FIG. 5 is a diagram showing an example of a monochrome code symbol converted from a color code symbol by the code symbol conversion process.

FIG. 5 is a diagram showing examples of a monochrome code symbol converted from a color code symbol according to the code symbol conversion process.

An input image 501 is an example of an image including a color code symbol image 502 (in the illustrated example, the color code symbol image 502 is represented by a monochrome image). The input image 501 is an image of a document, which has been read from the document by the image reading unit 400, and has been stored as image data in the RAM 203 in the step S301 in FIG. 4.

Output images 503, 505, 506, and 507 are images obtained by converting the input image 501, which is a color image, to monochrome images.

In the output image 503, the color code symbol image 502 included in the input image 501 has been converted to a monochrome code symbol image 504. Code symbol information items 510 and 511 are code symbol information held in the code symbol images 502 and 504, respectively. The output image 503 shows a case where a color code symbol is converted to a monochrome code symbol, and then an output image is synthesized such that the color code symbol included in the original image is replaced by the monochrome code symbol.

The illustrated code symbol information includes information, such as a document name, a creator, a creation date, an authorizer, an authorization date, and distribution restriction of document. The code symbol information 510 held in the code symbol image 502 before the conversion according to the above-described code symbol conversion process and the code symbol information 511 held in the code symbol image 504 after the conversion have the same contents and the same amount of information.

Further, as shown in the output image 505, a code symbol image 502a obtained by simply converting the color image to the monochrome image and the monochrome code symbol image 504 obtained by the above-described code symbol conversion process may be printed side by side in the same page.

Many of color code symbols themselves function as designs. Therefore, when a color code symbol is replaced with a monochrome code symbol, the design of the color code symbol may be deleted from the image data. To prevent this problem, in the case of the output image 505, the monochrome code symbol image converted from the color code symbol image by the code symbol conversion process is printed, and further, so as to cause the design included in the original image to remain, the monochrome image obtained by simply converting the input image is printed in combination with the monochrome code symbol image.

However, as shown in the output images 506 and 507, a document image may be directly printed without performing the code symbol conversion process with respect to a page including a color code symbol image, and then, a monochrome code symbol image converted from the color code symbol image may be printed on a page (second page) different from the page on which the document image has been printed or a reverse side of the page on which the document image has been printed.

Although in the present embodiment, the monochrome mode using black toner has been described, it is possible to obtain the same advantageous effects even by printing in a single-color mode using toner of a single color other than black, or printing in a special color mode for printing in a combination of a plurality of colors.

Even in the case of image formation performed by an image forming apparatus only capable of forming an image in a single color toner, in the case of printing using special invisible toner, and in the case of recording an image using a difference in gloss on a sheet surface caused by medical agent other than toner or surface processing, it is possible to perform code symbol formation in which the processed part is regarded as being in a single color. In such cases, even when the user does not make the color mode setting, a method of automatically converting a color code symbol to a single-color code symbol and outputting the converted single-color code symbol is effective. It is to be understood that the method of converting a color code symbol to a monochrome code symbol and using a synthesized image can be applied not only to industrial apparatuses other than image forming apparatuses but also to general apparatuses for processing goods.

According to the first embodiment, when image data including a color code symbol is printed, even in a case where monochrome printing is set, or in an apparatus environment of an apparatus only capable of performing monochrome printing being available, it is possible to print out the image data without losing information held in the color code symbol. As a consequence, it is possible to reuse a function which is made available by information held in the original color code symbol, using the monochrome code symbol printed out on a recording medium.

In the above-described first embodiment, the description has been given of the case where a code symbol in image data read from a document is converted, and is printed out on a recording medium, such as a sheet.

However, it is possible to obtain the same advantageous effects as provided by the above-described first embodiment also in a case where a code symbol in electronic data, such as PDF data, received from outside the image forming apparatus is converted and output to the outside.

Next, a second embodiment of the present invention will be described. The second embodiment the same configurations as those of the first embodiment described hereinabove with reference to FIGS. 1 to 3, and the same components as those of the first embodiment are denoted by the same reference numerals, thereby omitting the description thereof. Hereafter, only different points from the first embodiment will be described.

Figure 6:
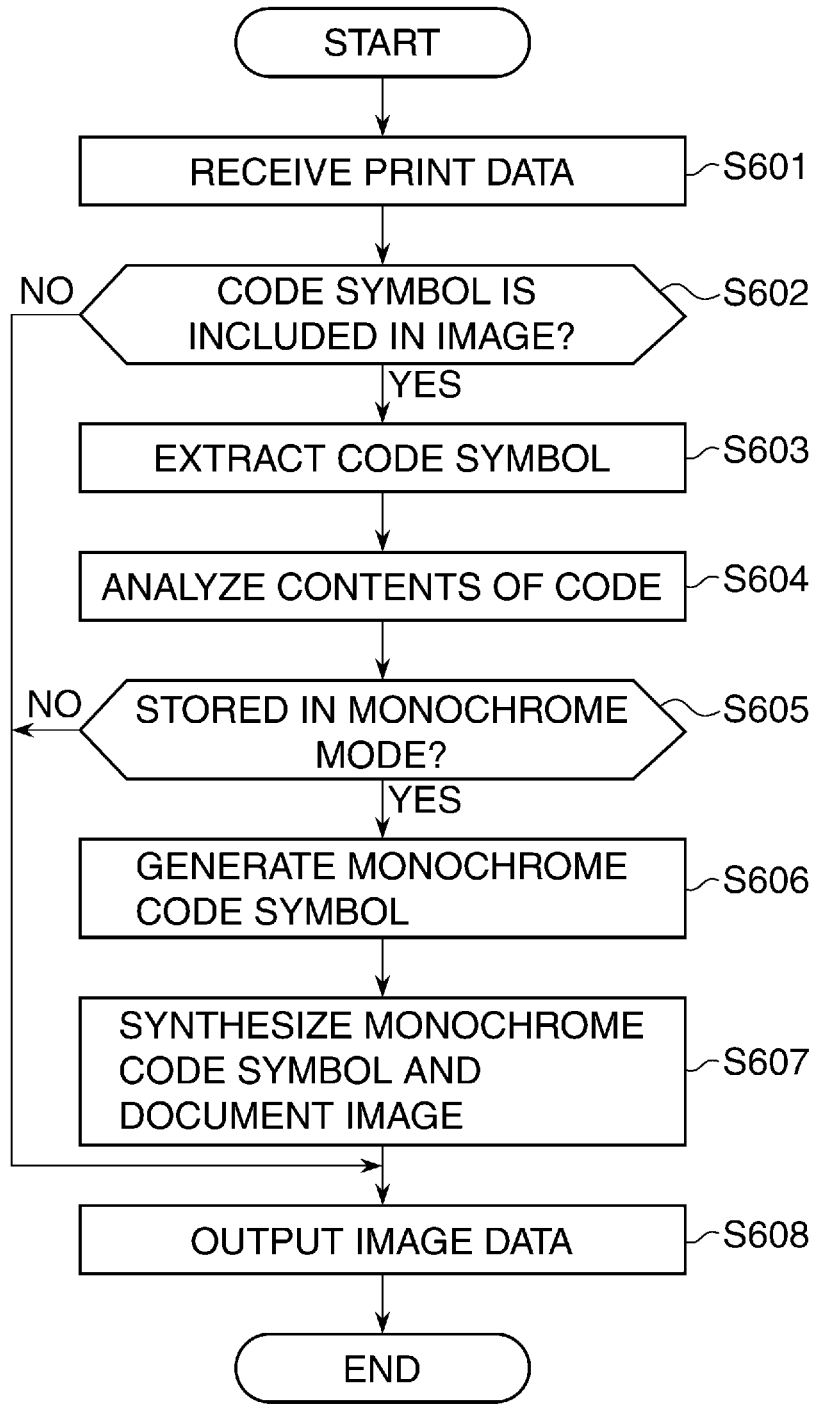
FIG. 6 is a flowchart of a code symbol conversion process executed by an image forming apparatus according to a second embodiment of the present invention.

FIG. 6 is a flowchart of a code symbol conversion process executed by the image forming apparatus according to the second embodiment. The code symbol conversion process described hereafter is realized by the CPU 201.

First, the CPU 201 receives print data from an external apparatus via the external interface 204 (step S601), and loads image data of the received print data into the RAM 203. The CPU 201 determines whether or not a code symbol is included in the image data (step S602). If it is determined that a code symbol is included, the CPU 201 proceeds to a step S603. On the other hand, if it is determined that no code symbol is included, the CPU 201 outputs the image data via the external interface 204 without executing code symbol conversion to be executed in the step S603 to a step S607 (step S608).

In the step S603, the CPU 201 identifies part of the image data where the code symbol is included, and extracts the code symbol. Next, the CPU 201 analyzes the read code symbol image, and acquires code symbol information from the code symbol (step S604). The steps S603 and S604 correspond to an example of the operation of the information acquisition unit.

Next, the CPU 201 checks the mode setting made by the user using the console section 205 when the image data has been stored to thereby determine whether or not the image data has been stored in the monochrome mode (step S605). If the image data has been stored in the full color mode, the CPU 201 proceeds to the step S608 without executing the code symbol conversion. On the other hand, if the image data has been stored in the monochrome mode, the CPU 201 proceeds to a step S606.

In the step S606, the CPU 201 generates a monochrome two-dimensional code symbol using the RAM 203 based on the code symbol information acquired from the code symbol in the step S604. The step S606 corresponds to an example of the operation of the code symbol generation unit.

Next, the CPU 201 synthesizes the code symbol image generated using the RAM 203 and the image data loaded into the RAM 203 in the step S601 (step S607). The step S607 corresponds to an example of the operation of the image synthesis unit. Then, the CPU 201 outputs the synthesized image data in the RAM 203 via the external interface 204 (step S608).

The above-described process shows an example in which a color code symbol is converted to a monochrome code symbol, and then an output image is synthesized such that the color code symbol included in the original image is replaced by the monochrome code symbol. Alternatively, as shown in the output image 505 in FIG. 5, the code symbol image 502*a* obtained by simply converting the color image to the monochrome image and the monochrome code symbol image 504 which has been converted by the above-mentioned code symbol conversion process may be printed side by side in the same page.

Further, as shown in the output images 506 and 507 in FIG. 5, the document image may be directly printed without performing the code symbol conversion process with respect to a page including a color code symbol image. Then, the converted monochrome code symbol may be printed on a page (second page) different from the page on which the document image has been printed or a reverse side of the page on which the document image has been printed.

According to the second embodiment, it is possible to obtain the same advantageous effects as provided by the above-described first embodiment.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-163595, filed Jul. 24, 2012, which is hereby incorporated by reference herein in its entirety.

What is claimed is:

1. An image forming apparatus comprising:
   an information acquisition unit configured to extract a code symbol from input image data, and acquire code symbol information from the extracted code symbol;
   a determination unit configured to determine whether or not an image to be output after performing image processing on the input image data is a single-color image;
   a code symbol generation unit configured to, when it is determined by said determination unit that the image to be output is a single-color image, generate a single-color code symbol based on the acquired code symbol information; and
   an image synthesis unit configured to synthesize the generated single-color code symbol with the image to be output, and output the synthesized image,
   wherein said image synthesis unit arranges the generated single-color code symbol and the code symbol on the input image side by side.

2. The image forming apparatus according to claim 1, wherein the input image data includes image data read from a document, and image data input from an external apparatus, and
   wherein the image processing includes copying of an image based on the input image data.

3. The image forming apparatus according to claim 1, further comprising a printing unit configured to print an image based on the input image data; and
   a setting unit configured to set printing to be performed by said printing unit, and
   wherein said determination unit determines that the image to be output is a single-color image when printing in the single-color mode is set by said setting unit, and
   wherein said printing unit prints the output image synthesized by said image synthesis unit.

4. An image forming apparatus comprising:
   an information acquisition unit configured to extract a code symbol from input image data, and acquire code symbol information from the extracted code symbol;
   a determination unit configured to determine whether or not an image to be output after performing image processing on the input image data is a single-color image;
   a code symbol generation unit configured to, when it is determined by said determination unit that the image to be output is a single-color image, generate a single-color code symbol based on the acquired code symbol information; and
   an image synthesis unit configured to synthesize the generated single-color code symbol with the image to be output, and output the synthesized image,
   wherein said image synthesis unit directly outputs a page including the extracted code symbol as an output image, and outputs the generated single-color code symbol in a manner arranged on a page different from the page on which the output image has been printed or a reverse side of the page on which the output image has been printed.

5. The image forming apparatus according to claim 4, wherein the input image data includes image data read from a document, and image data input from an external apparatus, and wherein the image processing includes copying of an image based on the input image data.

6. The image forming apparatus according to claim 4, further comprising a printing unit configured to print an image based on the input image data; and a setting unit configured to set printing to be performed by said printing unit, and wherein said determination unit determines that the image to be output is a single-color image when printing in the single-color mode is set by said setting unit, and wherein said printing unit prints the output image synthesized by said image synthesis unit.

7. An apparatus, comprising:

at least one non-transitory memory device;

at least one processor;

an information acquisition unit configured to extract a code symbol from input image data, and acquire code symbol information from the extracted code symbol;

a determination unit configured to determine whether or not an image to be output after performing image processing on the input image data is a single-color image;

a code symbol generation unit configured to, when it is determined by said determination unit that the image to be output is a single-color image, generate a single-color code symbol based on the acquired code symbol information; and an image synthesis unit configured to synthesize the generated single-color code symbol with the image to be output, and output the synthesized image, wherein said image synthesis unit arranges the generated single-color code symbol and the code symbol arranged at the predetermined location on the input image side by side, and wherein the information acquisition unit, the determination unit, and code symbol generation unit, and the image synthesis unit are implemented at least in part by the at least one processor executing a program recorded on the at least one non-transitory memory device.

8. The apparatus according to claim 7, wherein the input image data includes image data read from a document, and image data input from an external apparatus, and wherein the image processing includes copying of an image based on the input image data.

9. The apparatus according to claim 7, further comprising a printing unit configured to print an image based on the input image data; and a setting unit configured to set printing to be performed by said printing unit, and wherein said determination unit determines that the image to be output is a single-color image when printing in the single-color mode is set by said setting unit, and wherein said printing unit prints the output image synthesized by said image synthesis unit.

\* \* \* \* \*